United States Patent [19]
Branecky

[11] Patent Number: 6,097,171
[45] Date of Patent: Aug. 1, 2000

[54] METHOD AND APPARATUS FOR CONTROLLING AN INDUCTION MOTOR

[75] Inventor: Brian T. Branecky, Oconomowoc, Wis.

[73] Assignee: A. O. Smith Corporation, Milwaukee, Wis.

[21] Appl. No.: 09/226,807

[22] Filed: Jan. 6, 1999

Related U.S. Application Data

[60] Provisional application No. 60/073,238, Jan. 30, 1998.

[51] Int. Cl.$^7$ .................................................. H02P 7/42
[52] U.S. Cl. ........................... 318/808; 318/812; 318/810
[58] Field of Search ..................... 318/430, 432, 318/433, 810, 811, 807, 808, 798–802; 363/40, 42, 41, 43

[56] References Cited

U.S. PATENT DOCUMENTS

| | | | |
|---|---|---|---|
| 5,110,264 | 5/1992 | Murry | 417/45 |
| 5,447,414 | 9/1995 | Nordby et al. | 417/20 |
| 5,491,978 | 2/1996 | Young et al. | 62/126 |
| 5,492,273 | 2/1996 | Shah | 236/44 A |
| 5,506,486 | 4/1996 | Hayashi et al. | 318/808 |
| 5,656,912 | 8/1997 | Yang | 318/808 |
| 5,712,456 | 1/1998 | McCarthy et al. | 187/290 |

*Primary Examiner*—Paul Ip
*Attorney, Agent, or Firm*—Michael Best & Friedrich LLP

[57] ABSTRACT

A method and apparatus for improving the efficiency of an induction motor used in fluid pump and blower applications including a controller that reduces the flux generated by the motor at less than maximum motor loads.

31 Claims, 4 Drawing Sheets

$I < I_{(MAX)}$ $I < I_{(MAX)}$

METHOD AND APPARATUS FOR CONTROLLING AN INDUCTION MOTOR

RELATED APPLICATIONS

This application claims the benefit under 37 C.F.R. §119 of prior filed, co-pending Provisional Application No. 60/073,238, filed on Jan. 30, 1998.

BACKGROUND OF THE INVENTION

The invention relates to a method and apparatus for controlling an induction motor, and particularly to a method and apparatus for providing a constant control of air flow, fluid flow, fluid pressure or other physical output of an induction motor in such a way as to increase the efficiency of the motor.

It is commonly known in the art to provide an air handling system such as a heating, ventilating or air conditioning ("HVAC") system with a blower or fluid pump that either pushes air over or draws air across a heat exchanger or cooling coil to heat or cool the air, respectively, and transfer the air through a system of ducts and vents to a room or rooms where a thermostat is located. The thermostat provides feedback to the system to indicate the temperature in the room or rooms. In this way, the temperature of the air in those rooms is controlled. The blower typically includes a motor and the HVAC system also usually includes a controller for controlling the motor in response to various parameters such as room air temperature, air flow rate, motor speed, and motor torque.

It is also known that the efficiency of the heat transfer between the air and the heat exchanger cooling coil is directly dependent upon the flow rate of air across the heat exchanger or the cooling coil. Moreover, it is known that the total system efficiency can be maximized by maintaining the flow rate of the air at a specific set point. The set point or flow rate at which the system is most efficient is often determined empirically (typically by the manufacturer of the HVAC system), and is programmed into the controller of the motor. As vents in the system are opened or closed, however, the load on the motor changes, thereby changing the motor speed, blower output and stator current. The changing loads experienced by the motor make precise control of the blower output extremely difficult. One method and apparatus for controlling a blower motor under such conditions is shown and described in U.S. Pat. No. 5,656,912, which is incorporated herein by reference.

SUMMARY OF THE INVENTION

In a variable speed induction motor, the current ("I") supplied to the motor includes both a flux generating component ("$I_{flux}$") and a torque generating component ("$I_{torque}$"). In practice, $I_{flux}$ and $I_{torque}$ are about ninety degrees out-of-phase relative to one another. The actual torque ("T") output by the motor is determined by the relationship:

$$T = k[(I_{flux}) \times (I_{torque})];$$

where k is a known constant.

In prior art applications for variable speed induction motors (including the method and apparatus of U.S. Pat. No. 5,656,912), a flux output is generated that varies relative to the speed at which the motor is operating. However, at less than maximum motor load (for alternating current induction motors used in fluid pump or blower applications) there is a concomitant reduction in torque for the reduction in load. Thus, power is usually wasted because the motor is being supplied with current to generate flux that is in excess of what is necessary to generate the desired torque.

This phenomenon is clearly illustrated in FIGS. 6 and 7. FIG. 6 illustrates the torque and flux vector components of the motor current in the condition wherein the maximum output of the motor is demanded. Both the full flux and full torque components of the motor current are required. Hence, there are lower energy losses than at loads less than the maximum load capability of the motor.

FIG. 7 illustrates the torque and flux vector components of the motor current in a prior art controller. In the scenario of FIG. 7, the output required of the motor demands less than the maximum torque that the motor is capable of generating. However, because the amount of flux generated remains constant, energy losses result.

FIG. 8 illustrates the torque and flux vector components of the motor current of a motor connected to the controller of the present invention and in the condition wherein the output required of the motor demands less than the maximum torque that the motor is capable of generating. Where less than maximum output is required, the current supplied by the controller of the invention is manipulated to reduce the flux losses that result in controllers of the prior art.

Accordingly, the invention provides a method and apparatus for controlling a motor, and particularly, a method and apparatus for controlling an induction motor in an HVAC system to provide constant blower output control at an increased efficiency. Instead of the non-linear voltage-to-frequency relationship used in U.S. Pat. No. 5,656,912, the invention provides a controller for an induction motor that utilizes a linear voltage-to-frequency relationship and, for a given output requested by the thermostat, the controller curve fits the non-linear current feedback that is generated using the linear voltage-to-frequency relationship.

The invention further provides a controller for a motor having at least one stator phase, the controller comprising drive signal means for producing a current flow in the stator phase such that the current flow varies in response to varying load conditions for the motor; monitoring means for monitoring the current flow; change signal means for producing a change signal related to changes in the current flow; manipulation means electrically connected to the change signal means and to the drive signal means for changing the electrical drive signal in response to the change signal; and means for reducing the flux generated by the controller at any motor load that is less than the maximum load capability of the motor to thereby improve the operating efficiency of the motor.

The invention further provides a method for controlling a motor having at least one stator phase, the method comprising the steps of (A) producing an electrical drive signal in the stator phase resulting in a current flow in the stator phase; (B) determining a required motor load; and (C) reducing flux generated by the motor at required motor loads that are less than the maximum motor load capability.

It is a principal advantage of the invention to provide an efficient controller for any motor wherein the current has a known profile relative to the speed of the motor.

It is another advantage of the invention to provide a fluid pump for an HVAC system that provides substantially constant fluid flow or constant pressure irrespective of variations in the load on the fluid pump and at an extremely high efficiency.

It is another advantage of the invention to provide a controller for an induction motor which controller changes the voltage supplied to the motor in response to the total current supplied to the motor and output demanded by the controller.

It is another advantage of the invention to provide a method for controlling an induction motor in a fluid pump to provide a substantially constant fluid flow irrespective of load variations on the motor and at a high efficiency.

Other features and advantages of the invention are set forth in the detailed description and claims.

Figure 1:
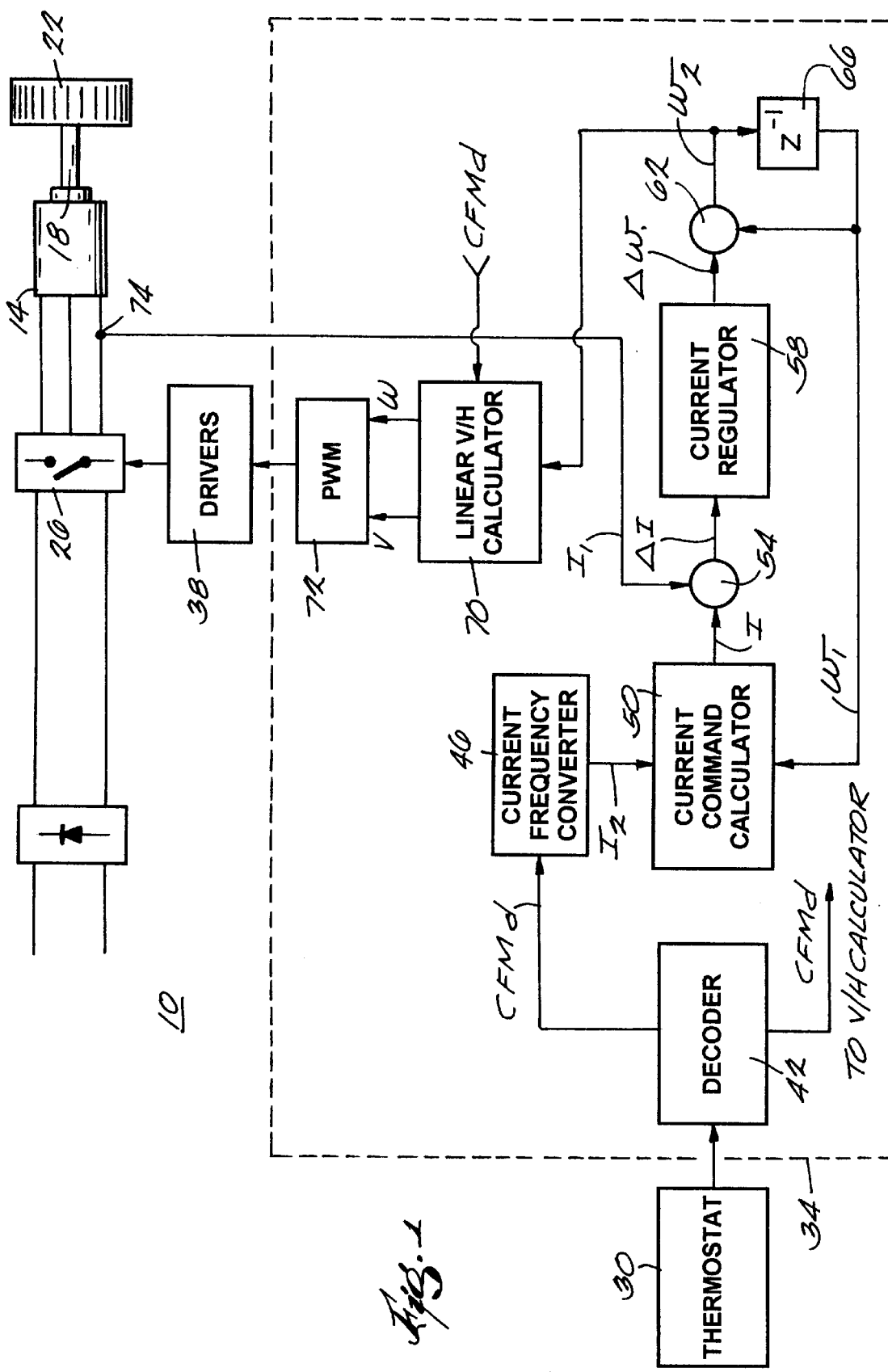
FIG. 1 is a schematic diagram of a motor controlled by a controller embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Schematically illustrated in FIG. 1 of the drawings is a motor controller 10 and a motor 14. While the controller can be used to control any motor in any application, the motor of the preferred embodiment is a three phase induction motor employed in a fluid pump. More particularly, the fluid pump of the preferred embodiment is a blower for use in an HVAC system. As stated above, in HVAC systems, it has been shown that the efficiency of heat transfer between the heat exchanger or cooling coil and the air crossing over the heat exchanger or cooling coil is directly dependent upon the flow rate of the air passing across the heat exchanger or cooling coil. Moreover, it has been determined that the efficiency of the heat exchange is maximized at a specific air flow rate (usually determined by the design characteristics of the heating element or cooling coil).

The motor 14 includes a stator (not shown) having three phase windings, and a rotor (not shown) mounted for rotation about a rotor axis (also not shown). As is commonly known in the art, energization of the stator phases causes rotation of the rotor. The motor 14 also includes an arbor 18 connected to the rotor for rotation therewith. An impeller or blower fan 22 is mounted on the arbor 18 so that as the fan 22 rotates, air is drawn over or forced over the heat exchange unit (not shown) and from there is delivered to a system of ducts (not shown) for distributing the air to a room or rooms. A series of switches 26 selectively electrically connect the motor 14 to electrical power (typically direct current derived from standard alternating current line voltage) in response to control signals produced by the controller 10.

The controller 10 includes a thermostat 30 that is located within the room or rooms to be heated or cooled. The thermostat 30 monitors the room air temperature and generates, in response to the room air temperature, control signals for initiating operation of the motor 14.

The controller 10 also includes a microprocessor 34 connected to the thermostat 30 to receive therefrom the thermostat control signals. The microprocessor 34 is also connected to the switches 26 supplying power to the motor 14. The microprocessor 34 controls the switches 26 to energize the motor 14 so that the fan 22 delivers a constant flow rate volume of air despite any change in the load conditions experienced by the motor 14. Typically, such load changes occur as vents in the duct system are opened or closed. AS is commonly known in the art, a series of drivers 38 are connected between the power switches 26 and the microprocessor 34.

The microprocessor 34 includes a decoder 42 for receiving the thermostat control signals and generating in response thereto a desired air flow rate signal ("$CFM_d$"). The microprocessor 34 also includes drive signal means or energizing means connected to the decoder 42 for producing an electrical drive signal or electrical stimulus resulting in current flow in the stator phase. While various means for producing the electrical drive signal are appropriate, the drive signal means of the preferred embodiment includes a current frequency converter 46 connected to the decoder 42 and a current command calculator 50 connected to the current frequency converter 46.

The microprocessor also includes change signal means for producing a change signal related to changes in stator current flow. While various means for generating the change signal are appropriate, in the preferred embodiment the change signal means includes a comparator 54 connected to the current command calculator 50.

The microprocessor also includes manipulation means connected to the comparator and to the drive signal means for changing the electrical drive signal in response to the output from the comparator 54. While various means for changing the electrical drive signal are appropriate, the manipulation means of the preferred embodiment includes a current regulator or integrator 58 connected to the comparator 54 and a summation node 62 connected to the current regulator 58.

The summation node 62 has an output which is fed back through a delay element 66 to an input of the summation node 62 and to the current command calculator 50. The output of summation node 62 is also connected to a frequency-to-voltage calculator 70. The frequency-to-voltage calculator 70 includes an input connected to the output of decoder 42 to receive the $CFM_d$ signal from decoder 42. A pulse width modulator 72 is connected to the frequency-to-voltage calculator 70. The pulse width modulator 72 is connected to the switch drivers 38 to output signals thereto and selectively connect the phases of the motor 14 to electrical power.

The controller 10 also includes monitoring means for monitoring the current flow in the stator phase. Any known means for monitoring or measuring the stator current is appropriate. In the embodiment shown in FIG. 1, the monitoring means is a current sensor 74 connected to at least one of the motor phases to detect motor phase current.

Figure 2:
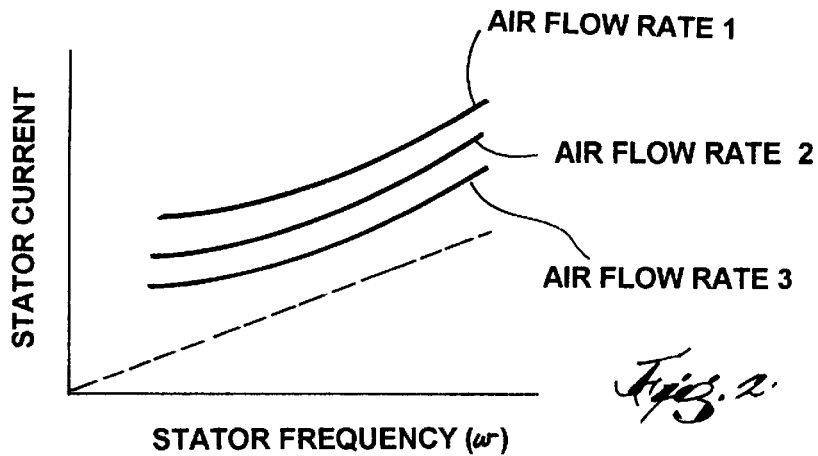
FIG. 2 is a graphical representation of the relationship between the stator current and the frequency of the electrical stimulus used to energize the motor.

In operation, the microprocessor 34 controls the motor 14 using the relationship between stator current, stator frequency and air flow rate shown in FIG. 2. This relationship has been empirically determined and, as clearly shown in FIG. 2, for a given air flow rate, the stator current versus the stator frequency relationship is generally non-linear, and can be defined by the non-linear equation:

$$y = ax^2 + (mx+b); \text{ where}$$

y=desired stator command current for the present time period (I);
a=a curve fitting constant;
x=stator command frequency for previous time period ($\omega_1$);
m=slope of current frequency curve (the slope is determined by the blower characteristics, for example, cage size, number of blades, etc.); and
b=the zero frequency or steady state no-load stator current ($I_2$).

By knowing the desired air flow rate at which the HVAC system is to operate, the zero frequency stator current $I_2$ at that air flow rate and the stator command frequency $\omega_1$ for the previous time period, the microprocessor 34 can easily calculate the desired A stator command current I at which the motor 14 must be energized to generate the desired air flow rate output. If the desired stator command current I differs from the actual stator current $I_1$, then the stator command frequency $\omega_1$ can be adjusted to compensate for the difference, which is assumed to be the result of a change in the load on the motor 14. In a broad sense, the controller can be used to control any motor where the relationship between the electrical signal used to energize the motor and the output of the motor is known.

Figure 4:
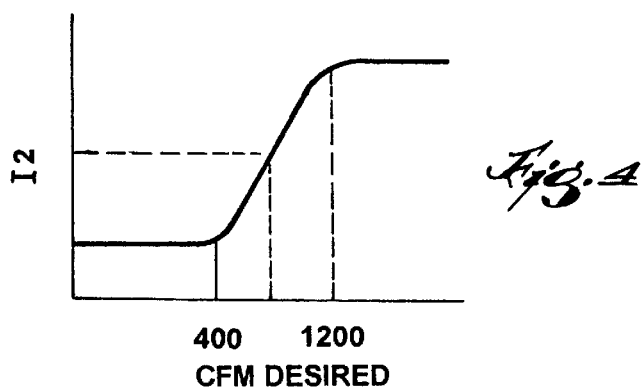
FIG. 4 is a graphical representation of the relationship between the desired fluid flow rate and the corresponding motor energization current.

More specifically, and referring to FIG. 1, the decoder 42 receives the thermostat inputs and generates in response to the thermostat inputs an output that is indicative of a desired cubic feet per minute flow output ($CFM_d$) for the motor blower. The current frequency converter 46 receives the $CFM_d$ signal and generates in response to the $CFM_d$ signal the zero frequency stator current value ($I_2$). The current frequency converter 46 can generate $I_2$ using a real time calculation, however, in the preferred embodiment, the current frequency converter 46 is simply a memory based look-up table that stores zero frequency stator current values for a number of different flow rates. The relationship between $CFM_d$ and $I_2$ is shown in FIG. 4. The current frequency converter 46 transmits the zero frequency stator current to the current command calculator 50.

At approximately the same time, the command frequency $\omega_1$, i.e., the command frequency from the previous 0.6 second time period, is fed back to the current command calculator 50 from the output of the summation node 62. In response to receipt of the zero frequency stator current $I_2$ and the command frequency signal $\omega_1$, the current command calculator 50 generates a command current I, i.e., the current at which the motor 14 should be energized for a given blower output. As stated above, the relationship used for this determination is shown in FIG. 2.

The command current I is fed to the comparator 54 and compared against the actual phase current $I_1$ as measured by the current sensor 74. The current comparator 54 outputs a current error value ($\Delta I$) that represents the difference between the actual stator phase current $I_1$ and the desired stator phase current $I_2$ for the desired air flow rate $CFM_d$.

Figure 3:
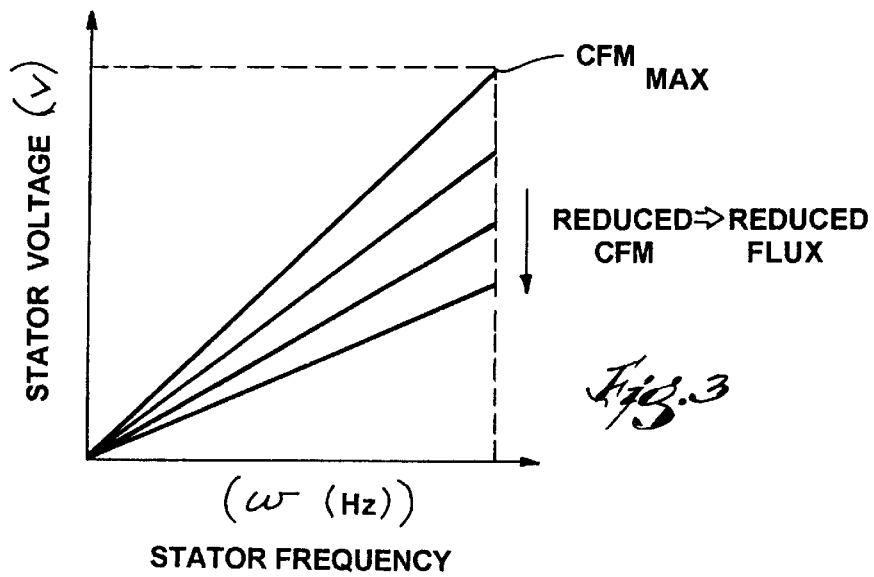
FIG. 3 is a graphical representation of the linear relationship between the stator voltage and the frequency of the electrical stimulus that is used for a given desired air flow rate.

The current error ($\Delta I$) is transmitted to current regulator 58 which integrates the current error signal $\Delta I$ to generate a manipulation output ($\Delta \omega$). The manipulation output $\Delta \omega$ is added to the previous command frequency $\omega_1$ to generate an updated command frequency $\omega_2$. The updated command frequency 107 $_2$ represents an updated frequency signal which is required at existing motor current $I_1$ to maintain the desired blower air flow rate output $CFM_d$. The command frequency $\omega_2$ is transmitted to the frequency-to-voltage calculator 70 which generates an updated command voltage. The frequency-to-voltage calculator 70 uses the relationship shown in FIG. 3 to generate the command voltage and this voltage is input to the pulse width modulator 72 along with the updated command frequency. While the voltage-to-frequency relationship shown in U.S. Pat. No. 5,656,912 was non-linear, the voltage-to-frequency relationship of the preferred embodiment is linear for a given $CFM_d$. The function performed by the frequency-to-voltage calculator 70 is performed using a real time software based calculation based on the equation:

$$V = K_f \omega_2;$$

where V is the updated command voltage, $K_f$ is a flux constant to convert the frequency units to voltage units as a function of $CFM_d$, and $\omega_2$ is the command frequency for the stator. The linear relationship between the updated command voltage (V) and the command frequency ($\omega_2$) for a given $CFM_d$ is shown in FIG. 3. By using a linear voltage-to-frequency relationship and curve fitting the non-linear current feedback, the slope of the voltage-to-frequency curve, i.e., the flux, is adjusted for the various $CFM_d$ that is commanded.

In other embodiments (not shown), the results of the function may be precalculated and, like the functions of the current frequency converter 46 and the current command calculator 50, the frequency-to-voltage converter function may be stored in a memory based look-up table. The command frequency ($\omega_2$) is also fed back to the current command calculator 50 through the delay element 66 which causes a transmission delay of approximately 0.6 seconds. This period of delay is to account for the fact that the load in the HVAC system changes slowly as the vents are opened or closed and the delay prevents instability of the controller.

In response to the updated command frequency $\omega_2$ and the updated command voltage V, the pulse width modulator 72 generates control signals for the drivers 38 which operate the switches 26 to generate an updated current output for the motor 14 to maintain the desired air flow rate output. The current sensor 74 will continue to measure the stator phase current. If the blower motor load remains the same from one 0.6 second interval to the next, then the stator phase current I, will not change, and there will be no resulting current error signal $\Delta I$ generated. As a result, the command frequency $\omega_2$ output at the summation node 62 will not change. Alternatively, if the blower motor load changes from one 0.6 second interval to the next, then a new current error signal $\Delta I$ will be generated to cause a recalculation of the command frequency $\omega_2$ as described above.

Figure 5:
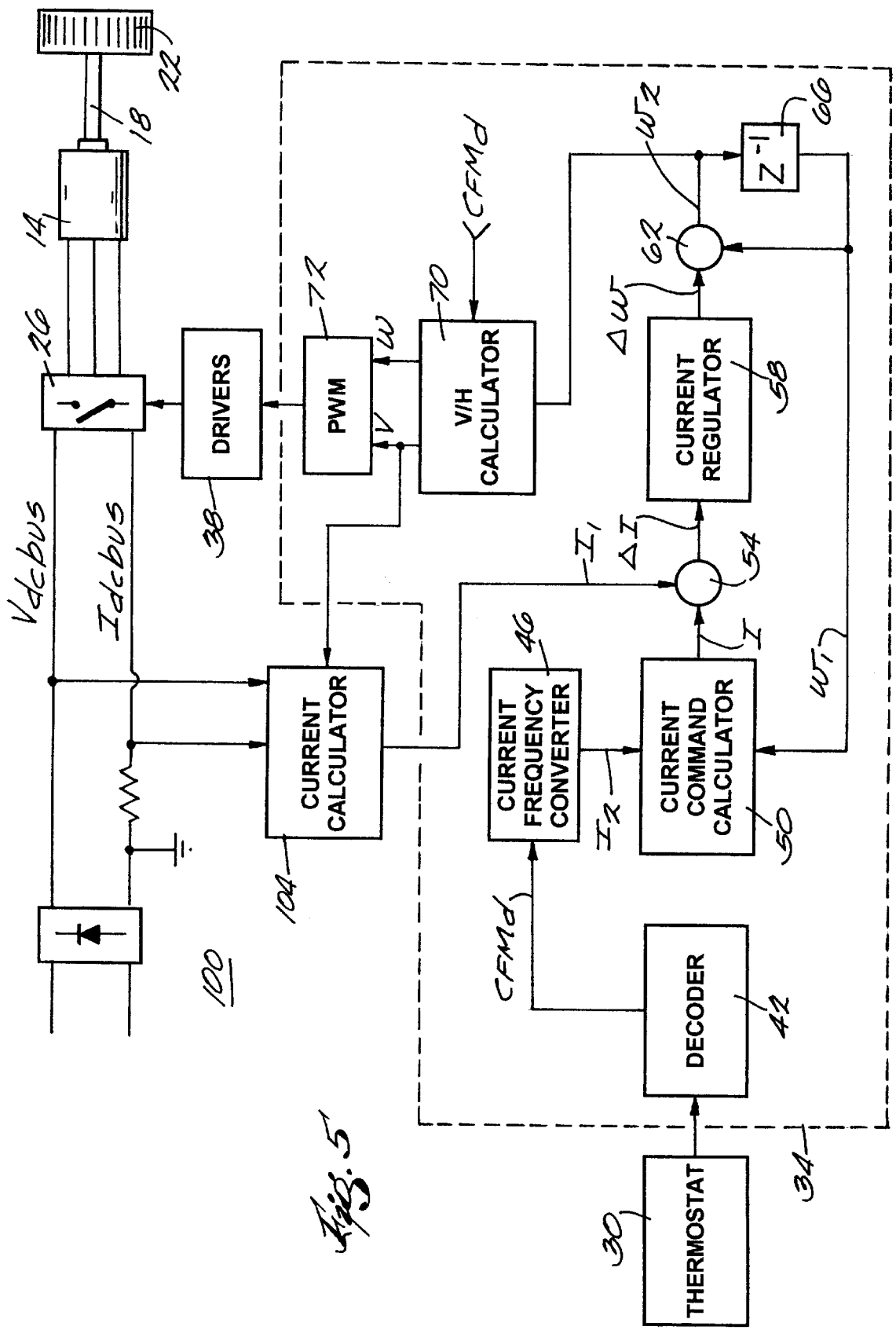
FIG. 5 is a schematic diagram of a controller that is another embodiment of the invention.
Figure 6:
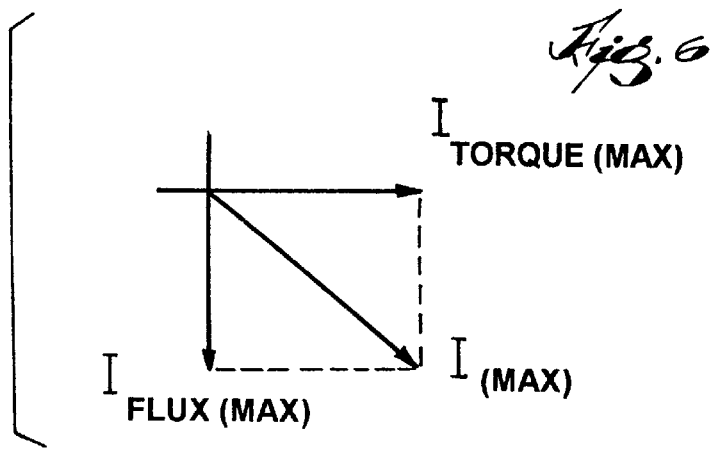
FIG. 6 is a graphical vector representation of motor current at the maximum output or load of the motor shown in FIGS. 1 or 5.
Figure 7:
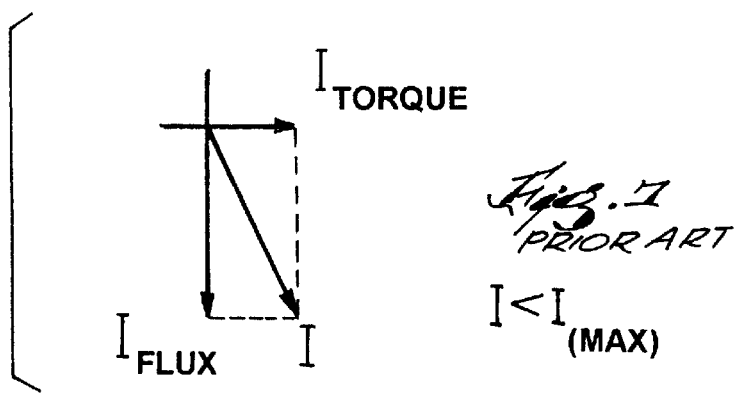
FIG. 7 is a graphical vector representation of the motor current of prior art induction motors at less than maximum commanded output or load.
Figure 8:
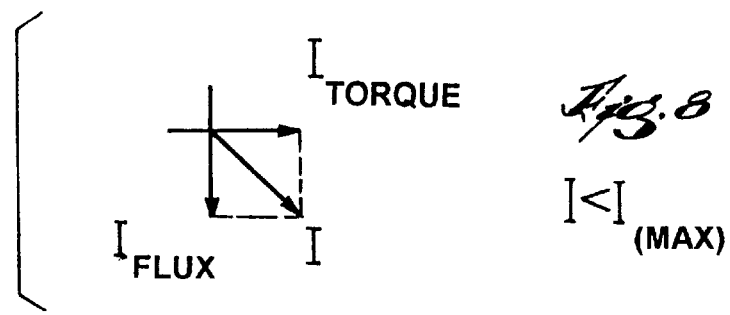
FIG. 8 is a graphical vector representation of the motor current of the motor of FIGS. 1 or 5 at less than maximum commanded output or load.

FIG. 5 illustrates a controller 100 that is an alternative embodiment of the invention. Like parts are identified using like reference numerals. In the embodiment shown in FIG. 5, the current and voltage from the d.c. bus, $I_{dcbus}$ and $V_{dcbus}$ are measured and input to a current calculator 104 along with the command voltage (V) generated by the voltage-to-frequency calculator 70. These parameters are used to calculate an approximated phase current ($I_{phase}$) that is input to the comparator 54. The equation used to generate ($I_{phase}$) is;

$$I_{phase} \cos \theta = (V_{dcbus} \times I_{dcbus})/V.$$

The use of the current calculator 104 to calculate an approximate phase current eliminates the need for an expensive phase current sensor. Moreover, calculating the estimated phase current from the d.c. bus current and voltage eliminates error that may result from measuring current that is recirculating between the inverter and the phase winding of the motor.

Various features and advantages of the invention are set forth in the following claims:

What is claimed is:

1. A controller for producing a constant output from a motor under varying load conditions, said controller comprising:
   a current sensor electrically connected to said motor to measure current flow to the motor;
   a first control circuit connected to said current sensor to generate, based on said current flow, a current error; and
   a second control circuit connected to said first control circuit to generate, based on the current error and a linear voltage-to-frequency relationship, a command voltage required to maintain said constant output.

2. A controller as set forth in claim 1, wherein said motor includes a d.c. bus, wherein said current sensor is connected to said d.c. bus, and wherein said current sensor measures current flow in said d.c. bus.

3. A controller as set forth in claim 1, wherein the motor has at least one stator phase and said current sensor is a phase current sensor connected to said stator phase, and wherein said current sensor measures current flow in said stator phase.

4. A controller as set forth in claim 1, wherein said motor is connected to a fan to generate an air flow at a rate, and wherein said second control circuit drives said motor to generate air flow from said fan at a constant rate under varying load conditions.

5. A controller as set forth in claim 1, wherein said first control circuit includes a comparator.

6. A controller as set forth in claim 5, wherein said first control circuit includes a current regulator connected to said comparator.

7. A controller for a motor used in a fluid system, the motor having a d.c. bus and at least one stator phase connected to said d.c. bus, said controller comprising:
   drive signal means for producing a current flow in said stator phase such that said current flow varies in response to varying load conditions for said motor;
   monitoring means for monitoring said current flow;
   change signal means for producing a change signal related to changes in said current flow;
   manipulation means electrically connected to said change signal means and to said drive signal means for changing said electrical drive signal in response to said change signal; and
   means for reducing the flux generated by the controller for a commanded flow rate of fluid through the fluid system.

8. A controller as set forth in claim 7, wherein said motor is connected to a fan to generate an air flow at a rate, and wherein said change signal drives said motor to generate air flow from said fan at a constant rate in response to varying load conditions in said fluid system.

9. A controller as set forth in claim 7, wherein said change signal means includes a comparator.

10. A controller as set forth in claim 7, wherein said manipulation means includes a current regulator connected to said change signal means.

11. A controller as set forth in claim 7, wherein said monitoring means includes a current sensor that measures current flow in said d.c. bus.

12. A method of controlling a motor to produce a constant output under varying motor load conditions, the motor having at least one stator phase, said method comprising:
   (A) determining a required motor output;
   (B) producing an electrical drive signal in said stator phase to generate said motor output;
   (C) determining variations in said motor load; and
   (D) changing said electrical drive signal in response to said variations in said motor load according to a linear voltage-to-frequency relationship to maintain said required motor output.

13. A method as set forth in claim 12 wherein said act (D) further comprises reducing the flux component of said electrical drive signal.

14. A method as set forth in claim 12 wherein said motor is connected to a fan for producing air flow, wherein said motor output is air flow, and wherein said act (A) includes the act of measuring air temperature using a thermostat.

15. A method as set forth in claim 12 wherein said act (B) includes the act of supplying current to said stator phase.

16. A method as set forth in claim 15 wherein said act (C) further comprises the act of measuring said current flow in said stator phase to detect variations in said current flow in said stator phase.

17. A method as set forth in claim 15 wherein said act (C) further comprises the act of measuring the d.c. bus current supplied to said motor, and the act of calculating an approximate phase current from said d.c. bus current.

18. A method as set forth in claim 12 wherein said act (D) further comprises the act of determining a desired change for the electrical drive signal to produce said desired motor output.

19. A method as set forth in claim 18 wherein said act of determining a desired change for the electrical drive signal uses the relationship between stator current, stator frequency and motor output.

20. An air handling system comprising:
   a blower including a motor having at least one stator phase, and a fan connected to the motor; and
   a controller for producing a constant output from said blower under varying load conditions, said controller including a current sensor electrically connected to said stator phase to measure a change in current flow in said stator phase in response to a change in the load on said blower, and a control circuit connected to said current sensor to generate, based on said change in current flow in said stator phase and a linear voltage-to-frequency relationship, a command voltage, and to generate, based in said command voltage, an updated drive current required to maintain said constant output.

21. An air handling system as set forth in claim 20, wherein said control circuit includes a comparator for producing an electrical signal related to said change in current flow in said stator phase.

22. An air handling system as set forth in claim 21, wherein said control circuit includes a current regulator connected to said comparator to generate said updated drive current in response to said electrical signal of said comparator.

23. A method of controlling an air handling system having a blower including a motor having at least one stator phase, and a fan connected to the motor so that said motor is under a load, said method comprising:

(A) determining a required motor output;
(B) producing an electrical drive signal in said stator phase to generate said motor output;
(C) determining variations in said motor load; and
(D) changing said electrical drive signal in response to said variations in said motor load according to a linear voltage-to-frequency relationship to maintain said required motor output.

24. A method as set forth in claim 23 wherein said act (D) further comprises reducing the flux component of said electrical drive signal.

25. A method as set forth in claim 23 wherein said act (A) includes the act of measuring air temperature using a thermostat.

26. A method as set forth in claim 23 wherein said act (B) includes the act of generating a current flow in said stator phase.

27. A method as set forth in claim 26 wherein said act (C) further comprises the act of measuring said current flow to said motor to detect variations in said current flow in said stator phase.

28. A method as set forth in claim 27 wherein said act of measuring said current flow further comprises the act of measuring the d.c. bus current and calculating therefrom an estimated phase current.

29. A method as set forth in claim 27 wherein said act of measuring said current flow further comprises the act of measuring current flow in said phase winding.

30. A method as set forth in claim 23 wherein said act (D) further comprises the act of determining a desired change for the electrical drive signal to produce said desired motor output.

31. A method as set forth in claim 30 wherein said act of determining a desired change for the electrical drive signal uses the relationship between stator current, stator frequency and motor output.

* * * * *